(No Model.)
H. P. COPELAND.
TELEGRAPH POLE PROTECTOR.
No. 373,925. Patented Nov. 29, 1887.
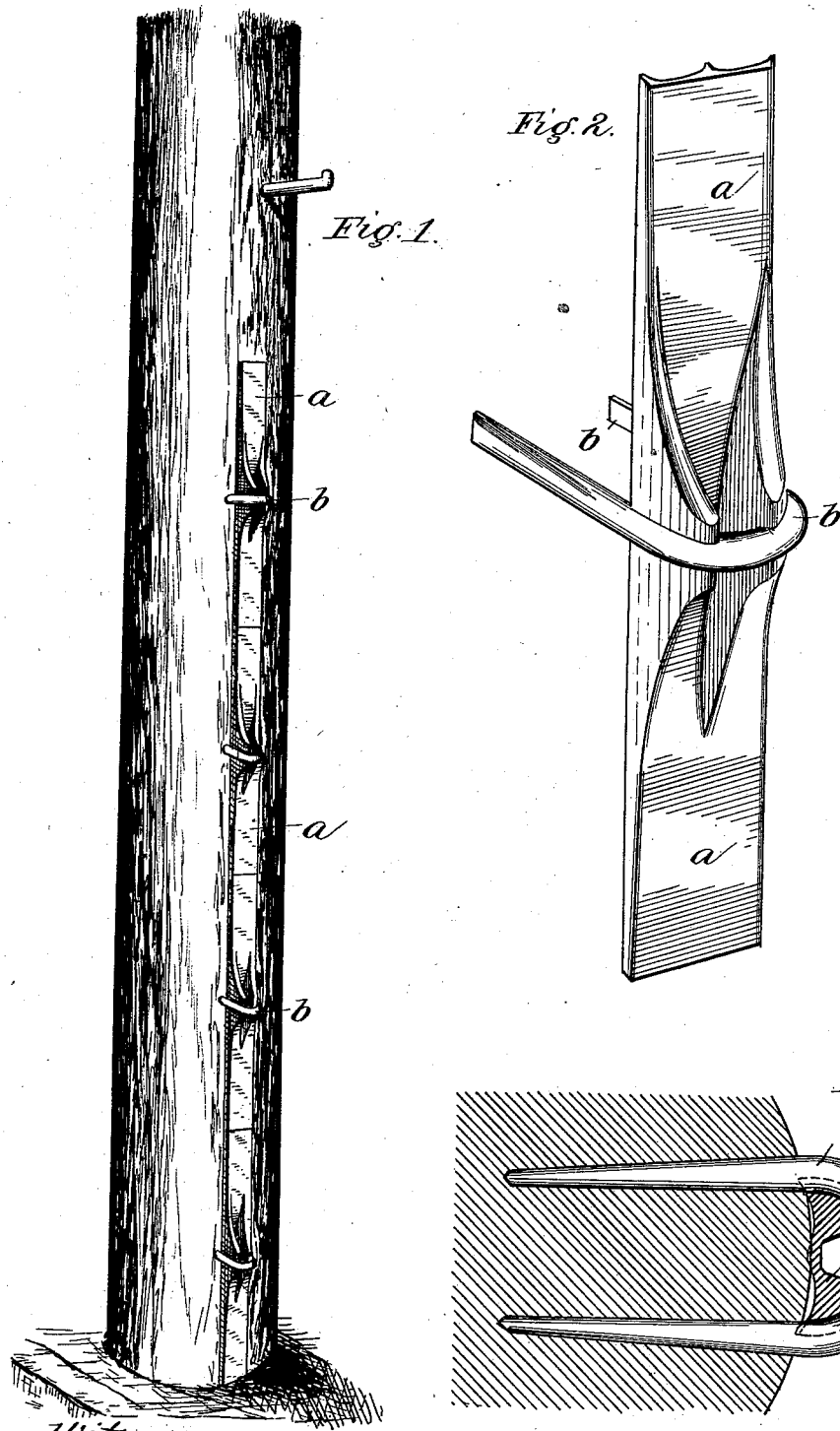
Witnesses:
Sam'l B. Dover
W. M. Giller
Inventor:
Herschel P. Copeland
by George M. Barton
attorney

UNITED STATES PATENT OFFICE.

HERSCHEL P. COPELAND, OF EAST ORANGE, NEW JERSEY, ASSIGNOR TO THE WESTERN ELECTRIC COMPANY, OF CHICAGO, ILLINOIS.

TELEGRAPH-POLE PROTECTOR.

SPECIFICATION forming part of Letters Patent No. 373,925, dated November 29, 1887.

Application filed August 19, 1887. Serial No. 247,342. (No model.)

*To all whom it may concern:*

Be it known that I, HERSCHEL P. COPELAND, a citizen of the United States, residing at East Orange, in the county of Essex and State of New Jersey, have invented a certain new and useful Improvement in Telegraph-Pole Protectors, of which the following is a full, clear, concise, and exact description, reference being had to the accompanying drawings, forming a part of this specification.

My invention relates to telegraph-poles, and its object is to prevent line-men from defacing the lower portion of the poles with climbers. Poles that are large and nicely finished are often greatly injured by the line-men sticking the spurs of their climbers into the sides of the pole, and more especially near the ground. The strength and appearance of telegraph-poles are thus often injured or impaired.

Usually steps are provided beginning at about ten feet from the ground, and the lineman, therefore, is only obliged to use his climbers for the purpose of reaching the iron pins forming the steps. It is desirable that the lower portion of the pole be as smooth as possible, so that boys will not be climbing up to the cross-arms. I have therefore provided a protector on opposite sides of the pole which is secured thereto in such manner as to afford loops for the spurs of the climbers, the loops, however, not projecting sufficiently to make steps.

My invention is illustrated in the accompanying drawings, in which—

Figure 1 is a side view of the lower portion of a telegraph-pole provided with my invention. Fig. 2 is a detailed perspective view of one section of my protector, shown somewhat shortened for convenience in illustration. Fig. 3 is a detailed sectional view thereof attached to the pole.

Like parts are indicated by similar letters of reference in the different figures.

It will be seen that the protector is composed of grooved metallic strips *a*, placed end to end one above the other, and secured to the pole each by a strip, *b*. A V-shaped groove is provided in each section above the staple. The walls or edges of this groove project outwardly about an inch at the center, and are cut away transversely, as shown, to provide a seat for the staple when driven in, as shown. Each section is thus made very strong at the center, as is necessary, while the staple offers a support for the spur of the climber. The upper end of each section is preferably beveled, as shown, so that the lower beveled end of the next section may fit over said upper end. The rear of each section is preferably beaded and slightly hollowed out between the beads, as shown, so that each section may be closely fitted and firmly secured to the pole, the beads being indented into the wood, as shown in Fig. 3.

Protectors are placed on opposite sides of the pole, and any number of sections may be used together as may be required.

Having thus described my invention, I claim as new and desire to secure by Letters Patent—

1. A pole-protector consisting of sectional strips placed end to end and secured each at the center by a staple, a groove being provided in each section to guide the spur of the climber to the staple, substantially as described.

2. A pole-protector consisting of one or more sections or strips, each strip being beaded at the rear and grooved in front, the walls of the groove sloping gradually from the center, and a staple driven into the pole over each section at the center, whereby the pole is protected from the spurs of the climbers of the line-men and supports provided for the spurs, substantially as described.

In witness whereof I hereunto subscribe my name this 8th day of August, A. D. 1887.

HERSCHEL P. COPELAND.

Witnesses:
A. J. WAGNER,
WM. M. GILLER.